United States Patent

[11] 3,616,151

[72] Inventor Gabriel Racopoulos
        Athens, Greece
[21] Appl. No. 702,608
[22] Filed Feb. 2, 1968
[45] Patented Oct. 26, 1971
[73] Assignee Elliniki Kiomihania Plastikon I1 "Ebepy"
        Anonyms Eteria
        St. John Rentis, Athens, Greece

[54] PLASTIC SHEET HAVING THICKENED MARGINS AND REINFORCED EYELETS IN MARGIN AREAS
    5 Claims, 5 Drawing Figs.
[52] U.S. Cl..................................................... 161/44,
        161/109, 161/118, 161/149
[51] Int. Cl...................................................... B32b 3/02,
        B32b 3/10

[50] Field of Search........................................... 161/109,
        116, 118, 149, 36-38, 41, 44, 46; 114/103

[56] References Cited
        UNITED STATES PATENTS
2,017,830  10/1935  Geller........................... 161/109
2,401,997  6/1946   Whitman....................... 161/109
3,073,303  1/1963   Schaar........................... 161/109
3,092,439  6/1963   Harrison........................ 161/109

Primary Examiner—John T. Goolkasian
Assistant Examiner—Willard E. Hoag
Attorney—Watson, Cole, Grindle & Watson ABSTRACT: A reinforced plastics sheet having integral anchorage points around its periphery and a method of manufacturing such a sheet by passing plastics material between recessed rolls.

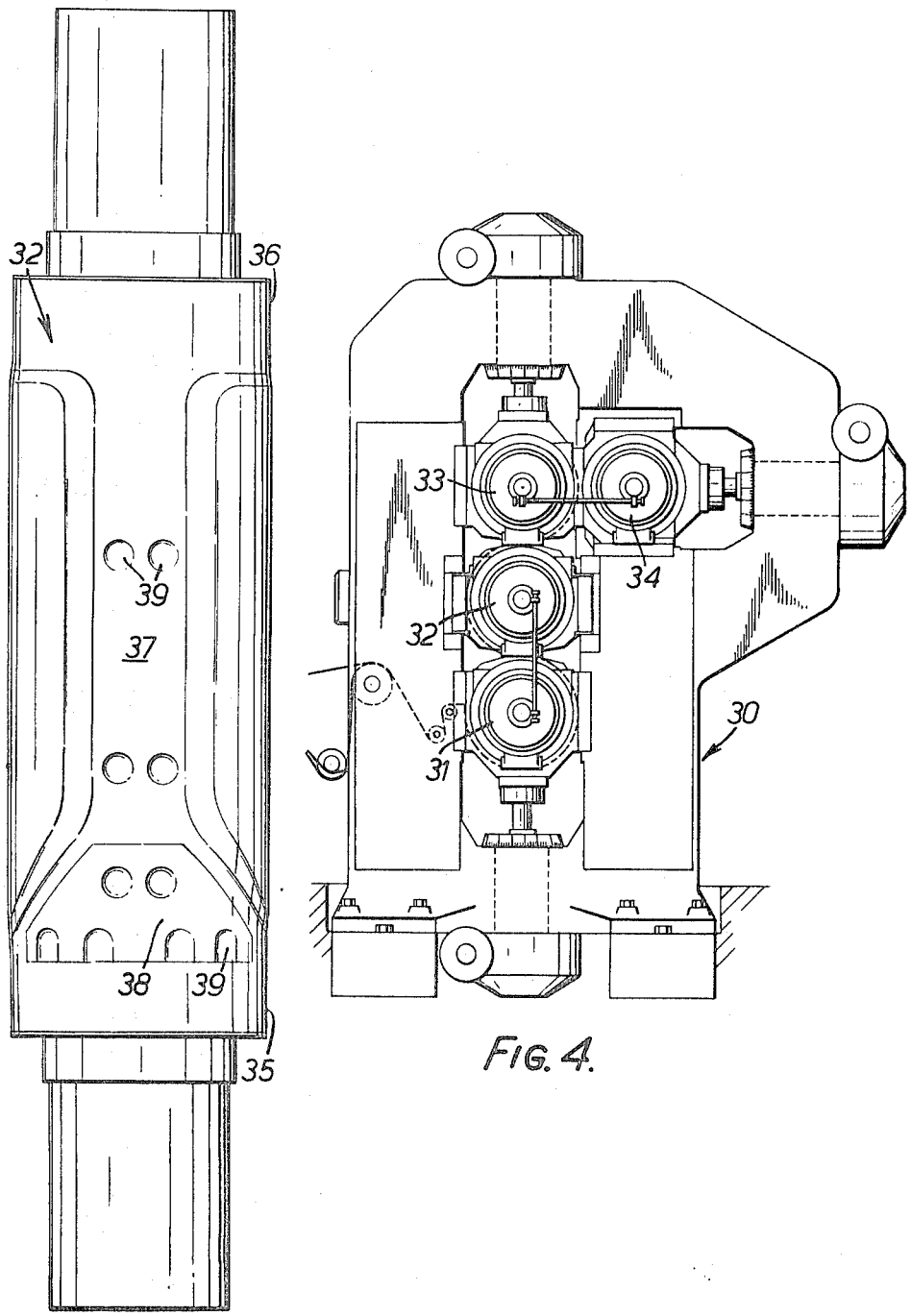

PLASTIC SHEET HAVING THICKENED MARGINS AND REINFORCED EYELETS IN MARGIN AREAS

The invention relates to methods of manufacture of plastics sheets and to reinforced plastics sheets having the characteristic form produced by such methods.

Although it is usually sufficient for plastics sheet to be only quite thin over most of its area to enable it to perform its function of, for example, preventing access of the elements to something being protected by the sheet, it is often found that difficulty arises because it is necessary to attach anchorages to the sheet to hold it down or to support it. It is found that, to enable these areas to have sufficient strength to stand up to the stresses imposed on them, a plastics sheet of greater thickness than is generally necessary has to be employed. In other words, over most of the area the sheet is thicker than is necessary while over other areas it may be too thin. Various methods have been proposed for attaching anchorages to plastics sheet such as metal eyelets or other rigid attachments for spreading the load but it is found that these tend to tear the sheet so that it is necessary to use a sheet the center part of which is unnecessarily thick in order to provide adequate strength in the vicinity of the anchorages.

It is an object of the invention to produce a plastic sheet with anchorages which will be stronger than previous sheets of the same thickness.

This is achieved by passing plastics material between a pair of rolls at least one of which has recesses in its surface to produce a sheet having isolated thickened regions around at least part of the margin of the sheet and forming a hole through each said thickened region from one side of the sheet to the other. The thickened regions thus produced are integral and homogeneous with the sheet so that anchorage loads imposed on them are spread to surrounding areas of the sheet in a way which minimizes tearing.

Preferably the rolls form part of a calender on which the plastics sheet is produced. Either the last roll or the penultimate roll of a multiroll calender is preferred and it is possible to have recesses in both the last roll and the penultimate roll. If recesses are formed in both the last roll and the penultimate roll, the recesses corresponding in shape and location, then the thickening will occur on both sides of the sheet whereas if there are recesses in only one roll or if there are recesses in both rolls and the recesses do not correspond in location then the thickenings will be on only one side of the sheet and the side opposite to the thickenings will be level with the surface of the bulk of the sheet.

It may not be possible to produce sheets of the required size direct from the calender and in this case sheets produced by the calender may be stretched hot after they leave the rolls. For example they may be stretched in two directions by means of a biaxial-stretching machine. An alternative way of producing large sheets is to make a composite sheet from a number of sheet sections each of which has been produced on a calender having a recessed roll. These sheets sections may be identical to one another but this is not necessary and accordingly sheet from different recessed rolls may be joined, as for example, by stitching or high-frequency welding. To produce a rectangular sheet it is possible to join two end sheets and a number of intermediate sheets between the end sheets.

In addition to the thickened regions, the sheet may have a margin extending around it which is thicker than the major part of the sheet. There may also be spaced transverse thickened strips each extending between spaced points on the margin. Thus with a rectangular sheet there may be a margin extending down both sides and across both ends of the sheet and the margins down the sides may be joined by spaced parallel transverse thickened strips leaving rectangular panels between them of the thickness of the major part of the sheet. A rectangular sheet may also have regions adjacent the four corners which are thicker than the margin.

In order that loads may be evenly distributed and to avoid tearing, all transitions between areas of different thickness should be gradual. Thus, between the said isolated thickened regions and the surrounding regions there will be tapering areas in which the thickness of the sheet decreases progressively.

One particular function for which sheets produced according to the methods of the invention are particularly suitable is in the production of tentlike covers for drying agricultural produce. Such covers may be used for the drying of grapes to form raisins and the drying of tobacco and cocoa beans and other agricultural products.

The invention may be carried into practice in various ways and one particular plastics sheet and its method of production in accordance with the present invention will now be described by way of example with reference to the accompanying drawings, in which:

FIG. 4 is a somewhat diagrammatic view of a calender used for the production of the sheet section shown in FIG. 2; and FIG. 5 is a plan view to a larger scale of one of the rolls of the calender shown in FIG. 4.

Figure 1:
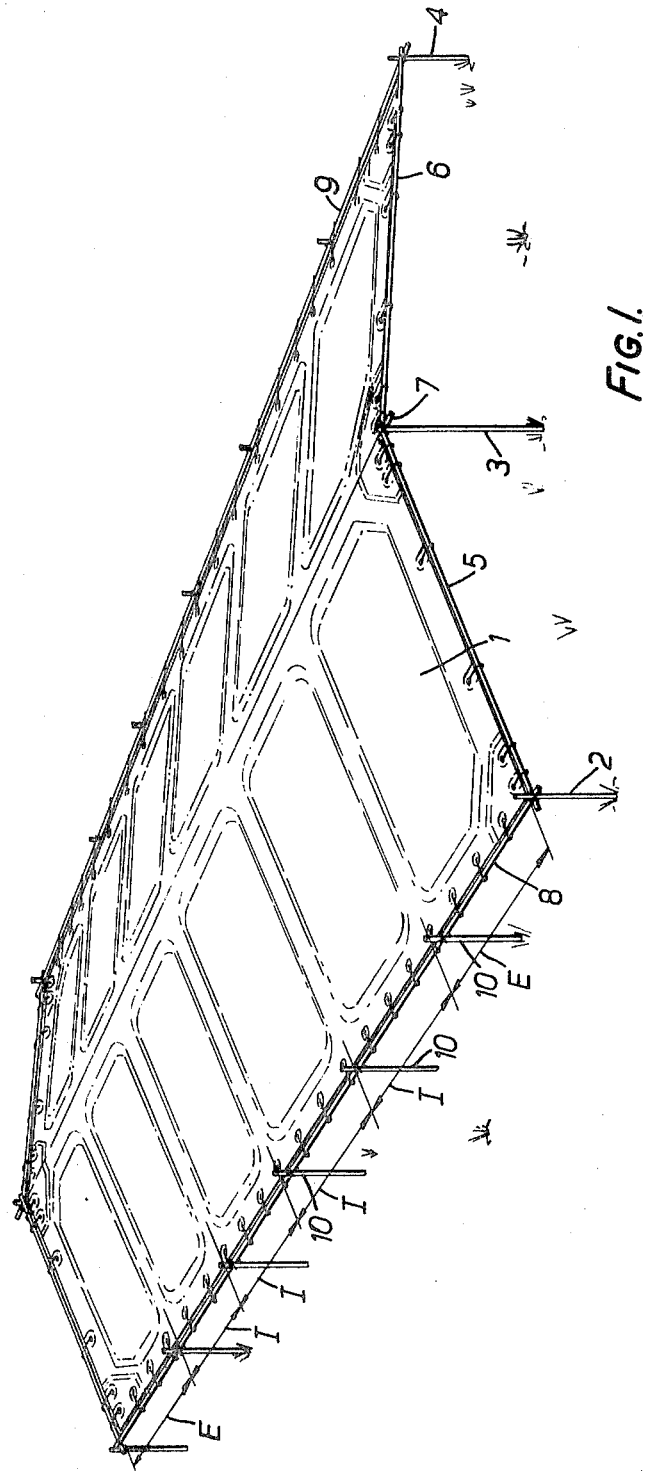
FIG. 1 is a perspective view of an agricultural cover comprising a plastics sheet.

FIG. 1 shows a tentlike structure having the form of a double pitched roof and consisting of a plastics sheet 1 of plasticized polyvinyl chloride and a framework made up from wooden rods. The framework includes at each end a gable formed by three uprights 2, 3, and 4 and two inclined rods 5 and 6, the two gables being joined by a ridge pole 7 and wires 8 and 9 at the eaves. These wires are also supported by intermediate upright rods 10. Wires which cannot be seen also extend from these upright rods 10 to the ridge pole 7 parallel with the inclined rods 5 and 6. The plastics sheet 1 is laid over the ridge pole 7 and the wires between the ridge pole and wires 8 and 9 and is anchored around its edges to the gable rods 5 and 6 and the eave wires 8 and 9 and is also tied down to the ridge pole 7. As will be explained in greater detail hereafter, the areas of the sheet which rest on the ridge pole 7 and the intermediate wires extending from the upright rods 10 to the ridge pole are thicker than the major part of the sheet, as are the margins all around the sheet to which the anchorages are attached.

The plastics sheet 1 is fabricated from two end sections E and four intermediate sections I which are joined together by high-frequency welding. An end section is shown to a greater scale in FIG. 2. It will be seen that it consists of a rectangle having two central areas 20 forming the major part of the sheet and having a thickness of 0.2 millimeters. These areas are surrounded by a marginal area 21 having a thickness of 0.5 millimeters. This area includes a strip 21a (seen at the bottom in FIG. 2) extending along the long edge of the sheet section which is to form the edge at one end of the composite sheet 1, strips 21b and 21c along the opposite short edges of the sheet section which edges are to form parts of the long side edges of the composite sheet 1, and a strip 21d along the other long side of the sheet section which strip is to form part of one of the intermediate areas which overlie the wires joining the uprights 10 to the ridge pole 7. Finally the margins along the long sides of the sheet section are joined by a transverse strip 21e which is to form part of the reinforcement extending along the center of the composite sheet 1 and which overlies the ridge pole 7. At the two lower corners of the sheet section adjacent the long edge to form the end edge of the composite sheet 1, there are approximately triangular regions 22 in which the sheet is thickened to approximately 1 millimeter. Halfway between these two triangular regions 22 there is a third triangular region 23 equal in size and shape to the two regions 22 joined together.

Figure 2:
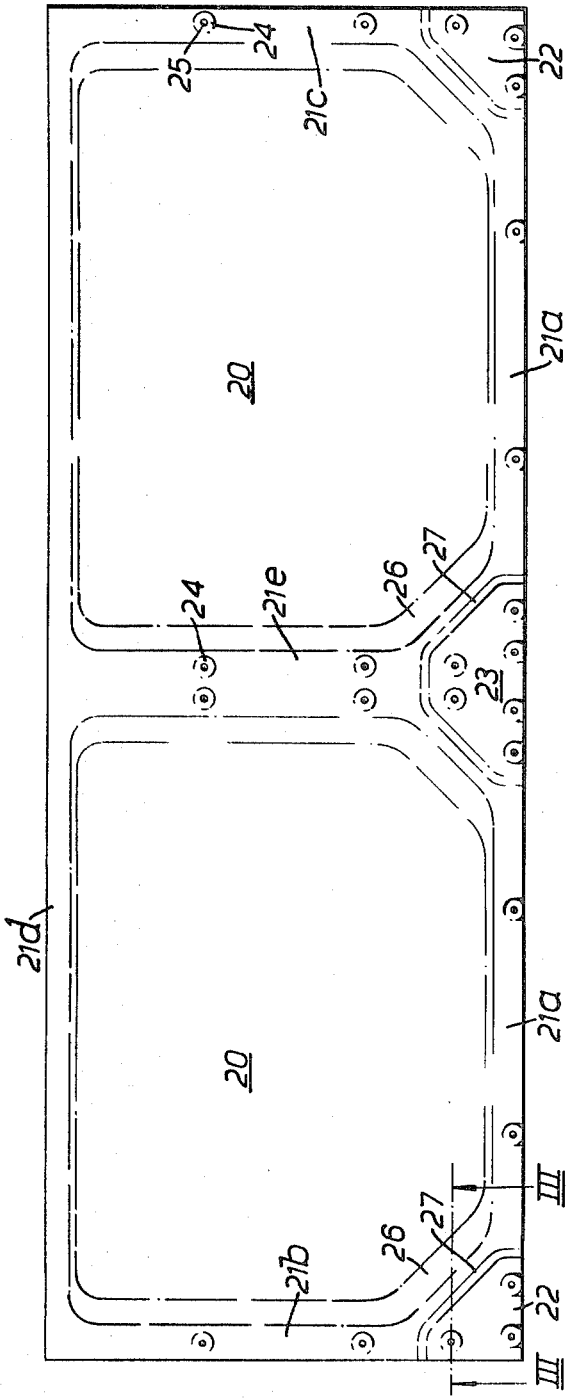
FIG. 2 is a plan view of a sheet section which is used in the construction of the sheet shown in FIG. 1.

At various points around the margin and in the thickened strip 21e there are anchorage points 24 formed by thickening the sheet to approximately 8 millimeters. Each of these regions is generally circular and is joined to the surrounding areas by tapered portions. Adjacent the edges these tapered portions may tend to merge towards the free edge of the material so that the thickened area becomes approximately D-shaped rather than truly circular and this in indicated along the lower margin as seen in FIG. 2. Passing through each of the thickened portions 24 is a hole 25 having an axis perpendicular to the plane of the sheet.

All transitions between thickened areas and the areas of lesser thickness adjacent thereto are gradual as is indicated by the transitional zones 26 and 27 between the chain-dotted lines.

Figure 3:
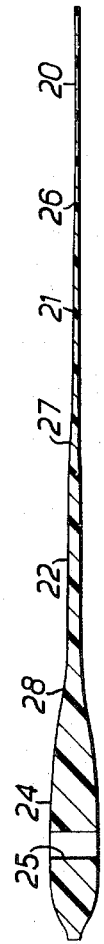
FIG. 3 is a cross section to a larger scale on the line III–III in FIG. 2.

The thicknesses of the various areas may more easily be understood from an examination of FIG. 3 which represents a section to a larger scale of the corner zone at the bottom left-hand corner of FIG. 2. From FIG. 3 it can be seen that the sheet thickens from 0.2 millimeters in the central area 20 forming the majority of the sheet to 0.5 millimeters in the marginal area 21, passing through the transitional zone 26; it then thickens to 1 millimeter in the corner area 22, passing through the transitional zone 26. The sheet is then thickened very considerably through a transitional zone 28 to an anchorage point 24 where the sheet has a thickness of approximately 8 millimeters, this being about 40 times the thickness of the central area 20. As can be seen from FIG. 3, in all the transitional zones 26, 27, 28 the thickness varies gradually so that the loads are evenly spread and stress concentrations are avoided.

The intermediate sheet sections I are similar to the end sheet sections E shown in FIG. 2 except that the lower half is symmetrical with the upper half and does not have the thickened corner-regions 22, the similar central region 23 and the anchorage points 24 along the lower edge.

The composite sheet 1 is constructed by joining an intermediate sheet section to the upper edge of the end sheet section shown in FIG. 2, joining to this intermediate sheet section a further intermediate sheet section and so on to the required number of intermediate sheet sections, and joining to the final intermediate sheet section another end sheet section similar to that shown in FIG. 2. This joining may be by double folded stitching but is preferably by high-frequency welding.

The end sheet section shown in FIG. 2 is produced on the calender 30 which is shown diagrammatically in FIG. 4. This consists of three heated rolls 31, 32 and 33 arranged one above the other and a fourth heated roll 34 arranged alongside the roll 33. A supply of plastics material is maintained above the nip between the rolls 33 and 34 and a continuous plastics sheet is formed which passes between the rolls 33 and 32, between the rolls 32 and 31 and is finally taken off to the left of the machine to pass to ancillary equipment for finishing and winding the sheet. The penultimate roll 32 of the calender is shown to a larger scale in FIG. 5. It will be seen that, in contrast to the normal roll of a calender which is smooth and of substantially constant diameter, the roll 32 has recesses ground in it, these recesses corresponding to the raised areas of the end sheet section E shown in FIG. 2. Thus at one end of the roll there is a portion 35 of lesser diameter to form the marginal strip 21a and a similar portion 36 at the other end to form a marginal strip 21d. Joining these margins is a shallow axial groove 37 which forms the end strips 21b and 21c and the intermediate strip 21e on the sheet shown in FIG. 2. At one end of this groove there is a deeper recess 38 which forms the triangular areas 22 and 23. In addition, there are deeper recesses 39 which are intended to form the anchorage points 24.

The calender produces an endless band of repeated panels, the end section shown in FIG. 2 consisting of two such panels, the two long edges representing the edges of the band and the two short edges representing lines of cut transverse to the length of the band.

The intermediate sheet sections I are formed on the calender shown in FIG. 4 but with the roll 32 replaced by a roll which is similar to that shown in FIG. 5 but which is symmetrical and accordingly has the lower end ground in the same way as the upper end shown in FIG. 5.

The recesses 39 forming the anchorage points are not provided with pins and the holes 25 extending through the anchorage points are formed in a subsequent operation. This is because in the particular calender being described the rolls 31 and 32 do not rotate at the same speed. However, in a calender in which these rolls do rotate at the same speed, pins may be provided in the recesses 39 to form the holes and a separate piercing operation can be dispensed with.

The sheets may be strengthened by incorporation of fibrous material as by lamination with a woven or nonwoven textile material such as net of natural or artificial fibers.

I claim:

1. A plastics sheet having isolated thickened regions spaced around at least part of the margin thereof, said thickened regions being integral and homogeneous with said sheet, and each said thickened region having a hole extending through it from one side of the sheet to the other, said thickened regions each having dimensions in the plane of said sheet which are at least five times the diameter of the hole therethrough, the hole extending through the thickest part of each said thickened region and there being a smoothly tapering transition region between each said thickened region and the major part of the sheet.

2. A sheet according to claim 1 in which each thickened region has a thickness at least 15 times that of the major part of the sheet.

3. A rectangular plastics sheet having a central zone which has a thickness between 0.05 mm. and 1 mm., a marginal zone extending around the periphery of the sheet, said marginal zone being thicker than said central zone, spaced transverse zones extending across said central zone and joining spaced points in said marginal zone, said transverse zones being thicker than said central zone, a corner zone at each corner of said sheet, said corner zones being thicker than said marginal zones, and isolated anchorage zones spaced around the periphery of said sheet in said marginal zone, each said anchorage zones being thicker than said corner zones and having a hole extending through it from one side of the sheet to the other, each said zone being integral and homogeneous with the other of said zones contiguous thereto.

4. A sheet according to claim 3 in which each anchorage zone has a thickness at least 15 times that of said central zone.

5. A plastic sheet having isolated thickened regions spaced around at least part of the margin thereof, said thickened regions being integral and homogeneous with said sheet, and each said thickened region having a hole extending through it from one side of the sheet to the other, said sheet also having a marginal zone extending continuously around at least part of the periphery thereof, said zone being thicker than the major part of said sheet and thinner than said thickened regions, said thickened regions being located within said marginal zone.

UNITED STATES PATENT OFFICE
CERTIFICATE OF CORRECTION

Patent No. 3,616,151               Dated March 29, 1971

Inventor(s) GABRIEL RACOPOULOS

It is certified that error appears in the above-identified patent and that said Letters Patent are hereby corrected as shown below:

On the title page, correct the name of the assignee to read --

ELLINIKI BIOMIHANIA EPEXERGASIAS PLASTIKON ILON "EBEPY" ANONYMOS ETERIA --

Signed and sealed this 15th day of August 1972.

(SEAL)
Attest:

EDWARD M. FLETCHER, JR.            ROBERT GOTTSCHALK
Attesting Officer                   Commissioner of Patents